(12) United States Patent
Wilson et al.

(10) Patent No.: US 8,108,700 B2
(45) Date of Patent: Jan. 31, 2012

(54) POWER SUPPLY IDENTIFICATION USING A MODIFIED POWER GOOD SIGNAL

(75) Inventors: Paul M. Wilson, Cary, NC (US); John D. Landers, Jr., Raleigh, NC (US); David John Steiner, Raleigh, NC (US); Kimberly A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 12/400,864

(22) Filed: Mar. 10, 2009

(65) Prior Publication Data

US 2010/0235652 A1 Sep. 16, 2010

(51) Int. Cl.
*G06F 1/00* (2006.01)
(52) U.S. Cl. ........ 713/300; 713/310; 713/340; 363/126; 363/146; 710/10
(58) Field of Classification Search .................. 713/300, 713/310, 340; 363/126, 146; 710/10
See application file for complete search history.

(56) References Cited

U.S. PATENT DOCUMENTS

| | | | |
|---|---|---|---|
| 5,434,870 A | 7/1995 | Benton et al. | |
| 5,787,174 A | 7/1998 | Tuttle | |
| 5,984,190 A | 11/1999 | Nevill | |
| 6,574,577 B2 * | 6/2003 | Stapleton et al. | 702/117 |
| 6,597,565 B1 * | 7/2003 | Kluth et al. | 361/679.23 |
| 6,778,096 B1 | 8/2004 | Ward et al. | |
| 6,836,848 B2 * | 12/2004 | Yu et al. | 713/300 |
| 7,227,652 B2 * | 6/2007 | Cronch et al. | 358/1.14 |
| 7,243,246 B2 * | 7/2007 | Allen et al. | 713/300 |
| 7,296,164 B2 * | 11/2007 | Breen et al. | 713/300 |
| 7,363,518 B2 * | 4/2008 | Critz et al. | 713/300 |
| 7,392,410 B2 * | 6/2008 | Allen et al. | 713/310 |
| 7,490,252 B2 * | 2/2009 | Tsai | 713/300 |
| 7,634,667 B2 * | 12/2009 | Weaver et al. | 713/300 |
| 7,653,823 B2 * | 1/2010 | Benton et al. | 713/300 |
| 7,657,731 B2 * | 2/2010 | Cheng et al. | 713/1 |
| 7,911,817 B2 * | 3/2011 | Kasprzak et al. | 363/146 |
| 2007/0143636 A1 | 6/2007 | Bailey et al. | |
| 2009/0135633 A1 * | 5/2009 | Ikeuchi et al. | 363/126 |
| 2010/0253257 A1 * | 10/2010 | Clothier et al. | 318/400.12 |
| 2011/0102136 A1 * | 5/2011 | Nakashima | 340/5.8 |
| 2011/0107120 A1 * | 5/2011 | Nakashima | 713/300 |

OTHER PUBLICATIONS

Intel Corporation. ATX12V Power Supply Design Guide. Version 2.01. 2004.*
Astec. AK80A. Data Sheet. Doc No. 1202. Nov. 5, 1998.*
Intel Corporation. ATX Specification. Version 2.2. 2004.*
Wikipedia, "Power Good Signal", http://en.wikipedia.org/wiki/Power—good, Feb. 11, 2009, 1 page.
Gary Brown, "How PC Power Supplies Work", http://computer.howstuffworks.com/power-supply.htm, Feb. 11, 2009, pp. 1-2.

* cited by examiner

*Primary Examiner* — Matthew Spittle
(74) *Attorney, Agent, or Firm* — Thomas Tyson; Jeffrey L. Streets

(57) ABSTRACT

Method, system and apparatus enabling a computing system to automatically identify the capabilities of a power supply coupled to the computing system. The power supply includes a controller that sends an identification code to a computing system prior to sending a power good signal to the computing system. The identification code and the power good signal are preferably sent over a single conductor, such as a power supply connector pin. The computing system receives the identification code for cross-referencing against a list of power supply identification codes and associated capabilities. Optionally, instructions from the computer system to an output device may be controlled as a function of the identified power supply capabilities.

18 Claims, 2 Drawing Sheets

POWER SUPPLY IDENTIFICATION USING A MODIFIED POWER GOOD SIGNAL

BACKGROUND OF THE INVENTION

1. Field of the Invention

The present invention relates to the identification of a power supply to a computing system.

2. Background of the Related Art

Computer power supplies are typically disposed in a chassis along with most of the computer components, such as the processors, memory and input/output devices, such as a graphics card. The power supply is typically responsible for converting an alternating current (AC) voltage into well-regulated direct current (DC) voltages and currents that are needed for the operation of a computer.

Power supplies also provide a signal called the Power Good signal, which is sometimes referred to as Power_OK or Power_Good. The purpose of the Power Good signal is to tell the computer that all is well with the power supply and that the computer can continue to operate normally. If the Power Good signal is not present, the computer shuts down. In this manner, the Power-Good signal prevents the computer from attempting to operate on improper voltages and damaging itself.

The Power Good signal is a +5 volt (V) signal generated in the power supply when it has passed its internal self-tests and the outputs have stabilized. This normally takes between 0.1 and 0.5 seconds (100-500 milliseconds) after you turn on the power supply switch. The Power Good signal is then sent to the computer's motherboard, where the signal is received by a control/decode module, which may be included in or part of a processor timer chip that controls the reset line to the processor. In the absence of the Power Good signal, the timer chip continuously resets the processor, which prevents the computer from running under bad or unstable power conditions. When the timer chip receives the Power Good signal, it stops resetting the processor. If the power supply cannot maintain proper outputs, such as when a brownout occurs, the Power Good signal is withdrawn, and the processor is automatically reset. When proper output is restored, the Power Good signal is regenerated, and the computer again begins operation. By withdrawing the Power Good signal, the computer never receives the bad power because it is stopped quickly (reset) rather than allowed to operate on unstable or improper power levels, which can cause parity errors and other problems.

Power supplies may be coupled to a computer in various ways, but power supplies typically have a connector with a well-defined pin out for coupling directly to the motherboard. The number of conductors in a power supply connector may vary from one power supply to another, although there are several connector pin outs that are widely used. These pin outs often include components that are color-coded to help assure that an appropriate power supply is being coupled to the computer and that the connector is oriented correctly. For example, the color black may indicate a conductor pin for electrical grounding, orange may indicate a +3.3 V DC pin, red may indicate a +5 V DC pin, yellow indicates a +12 V DC pin and so forth. In a common power supply connector, the color grey may indicate a conductor pin that is reserved for the Power Good signal.

BRIEF SUMMARY OF THE INVENTION

One embodiment of the present invention provides a method comprising a power supply sending an identification code to a computing system prior to sending a power good signal to the computing system. The method preferably further comprises sending the identification code and the power good signal over a single conductor, such as a power supply connector pin.

Another embodiment of the invention provides a system comprising a computer coupled to a power supply, wherein the power supply has a controller that outputs an identification code prior to outputting a power good signal. The computer is preferably coupled to the power supply by a power supply connector having a plurality of conductor pins, such as a conductor pin for auxiliary power, at least one conductor pin for main power, and a conductor pin for the power good signal.

Yet another embodiment of the invention provides a computer program product including computer usable program code embodied on a computer usable medium for identifying capabilities of a power supply coupled to the computer. This computer program product comprises computer usable program code for receiving an identification code from a power supply over a power supply conductor prior to receiving a power good signal over the power supply conductor, and computer usable program code for cross-referencing the received identification code against a list of power supply identification codes and the capabilities associated with each of the identification codes to identify the capabilities of the power supply. The computer program product preferably further comprises code for controlling instructions from the computer system to an output device as a function of the identified power supply capabilities.

DETAILED DESCRIPTION OF THE INVENTION

Figure 1:
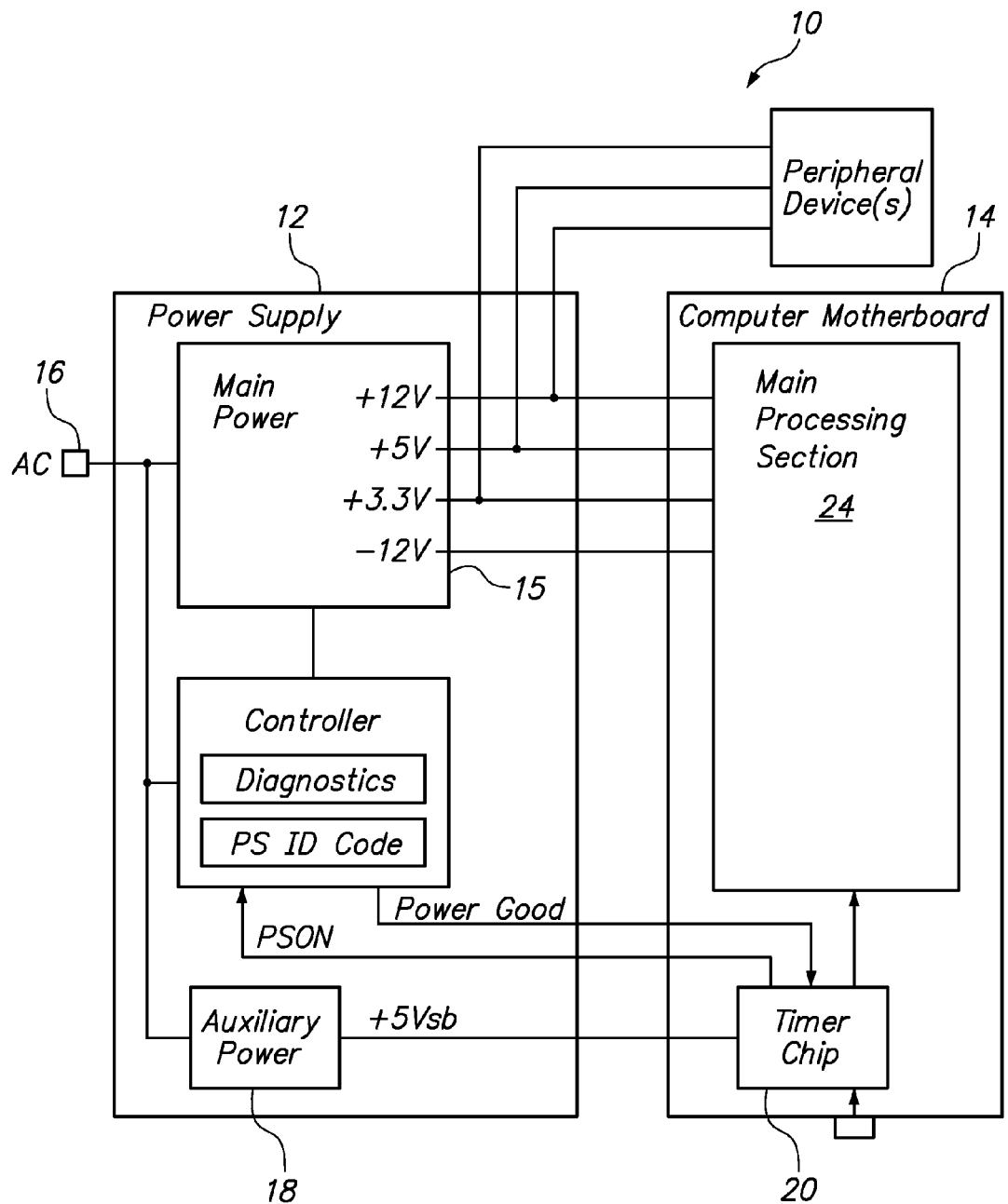
FIG. 1 is a diagram of a computer system including a power supply coupled to a computer motherboard.

One embodiment of the present invention provides a method comprising a power supply sending an identification code to a computing system prior to sending a power good signal to the computing system. Accordingly, the computing system is be able to recognize the precise model and/or revision of power supply that is providing power to the computing system. This type of information can be communicated in high-end systems via a serial bus interface, but this requires complex and expensive hardware to be present in the power supply. The present method provides power supply identification in a manner that is especially suitable to low-end computing systems, such as point-of-sale (POS) terminals, in the absence of a serial bus interface.

The method may further comprise sending the identification code and the power good signal over a single conductor, such as a power supply connector pin. By using the already-present power good signal for power supply identification, no additional serial bus connections are needed on the power supply connector. The power supply controller can be programmed to send the power supply identification code after receiving a "power supply on" (PSON) signal from the motherboard, yet before the Power Good signal is provided. The Power Good signal is utilized in the typical manner.

Although the computing system will receive the identification code prior to the Power Good signal, the power supply may already be providing auxiliary power to the computing system. For example, auxiliary power from the power supply may allow operation of the timer chip, any dedicated control/decode module, or similar integrated circuit other than the main processors, which can receive and store the identification code. Then, after the Power Good signal has been received, the computing system is able to identify the capabilities of the power supply. The power supply capabilities may be identified by the timer chip, control/decode module, or dedicated firmware operating on the auxiliary power, or by an operating system or application software running on the processors.

In a further embodiment, identifying the capabilities of the power supply includes the computing system cross-referencing the received identification code against a list of power supply identification codes and the capabilities associated with each of the identification codes. The list of codes may be stored in memory and searched as needed. The capabilities stored in association with each of the codes may provide a partial or comprehensive list of capabilities.

Power-supply identification in low-end systems may provide certain advantages. For example, in a POS system where input/output (I/o) power is critical, the system and the I/o can better utilize the installed power supply when the system and/or I/o are able to identify the capabilities of the power supply. This is especially true for power-intense activities such as printing. Furthermore, identification of the model or revision number for the power supply can be accomplished by service personnel without powering down the system, removing the power supply, and visually inspecting the unit. This ease of identifying the power supply may be beneficial when large-scale replacements of a particular model or revision of power supply is required in the field, particularly since most power supplies are installed within the same chassis that houses the computing system.

Another embodiment of the invention provides a system comprising a computer coupled to a power supply, wherein the power supply has a controller that outputs an identification code prior to outputting a power good signal. The computer is preferably coupled to the power supply by a power supply connector having a plurality of conductor pins, such as a conductor pin for auxiliary power, at least one conductor pin for main power, and a conductor pin for the power good signal. The power supply controller preferably transmits the identification code and the power good signal over the same conductor pin. In one embodiment, the system further comprises an output device receiving power from the power supply and output signals from the computing system.

Yet another embodiment of the invention provides a computer program product including computer usable program code embodied on a computer usable medium for identifying capabilities of a power supply coupled to the computer. This computer program product comprises computer usable program code for receiving an identification code from a power supply over a power supply conductor prior to receiving a power good signal over the power supply conductor, and computer usable program code for cross-referencing the received identification code against a list of power supply identification codes and the capabilities associated with each of the identification codes to identify the capabilities of the power supply. The computer program product preferably further comprises code for controlling instructions from the computer system to an output device as a function of the identified power supply capabilities.

FIG. 1 is a schematic diagram of a point-of-sale (POS) computer system 10 having a single power supply 12 used to power a single motherboard 14 as well as one or more peripheral device. In a power-on sequence, alternating current (AC) is first applied at an AC input 16, providing five volts ("+5Vsb") to the motherboard 14 by way of a standby regulator 18 included with the power supply 12. A micro-controller 20 included with the motherboard 14 may go through some diagnostics before asserting a power-on signal "PSON#" to the power supply 12. The main power section 15 of the power supply responds to the PSON# signal with a "PWOK" (i.e. power OK) signal to inform the microcontroller that it has turned on the main power in the power supply 12. Turning on the main power in this manner provides power to the rest of the server motherboard 14. Bulk voltage outputs +12V, +5V, +3.3V, and −12V feed a main processing section 24 of the motherboard 14 that includes, for example, as processors (e.g., CPUs), memory (e.g., DIMMs), and applications cards (e.g., PCI cards). This specification reliably powers-up the single motherboard 14 with the single power supply 16.

Figure 2:
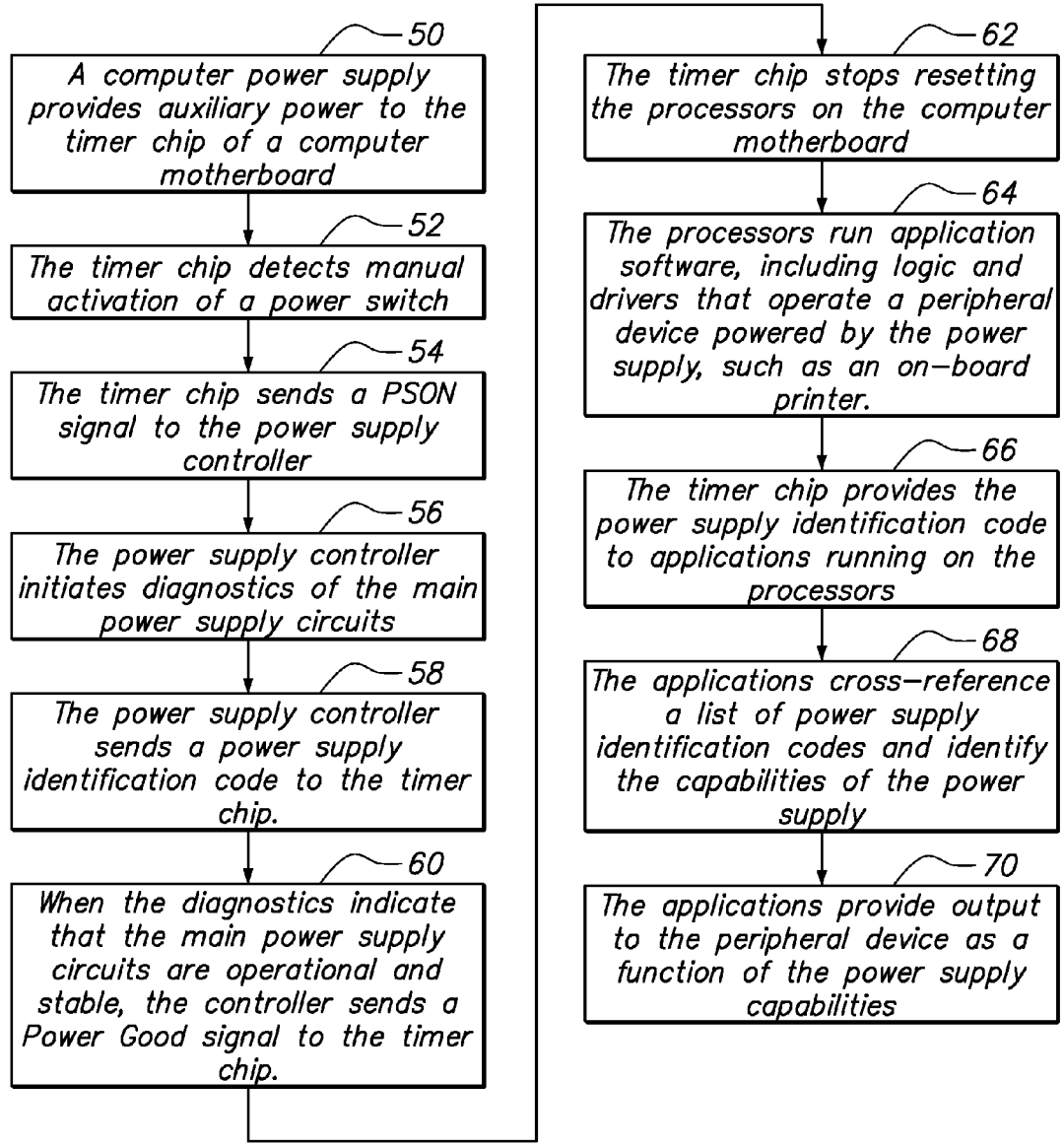
FIG. 2 is a flowchart of a method that identifies the capabilities of the power supply to the computer system.

FIG. 2 is a flowchart of a method that identifies the capabilities of the power supply to the computer system. In step 50, a computer power supply provides auxiliary power to the timer chip of a computer motherboard. In step 52, the timer chip detects manual activation of a power switch, typically located on the front of the chassis. In step 54, the timer chip sends a PSON signal to the power supply controller. In step 56, the power supply controller initiates diagnostics of the main power supply circuits. These diagnostics verify that the stability of the proper voltages. In step 58, the power supply controller sends a power supply identification code to the timer chip. In step 60, when the diagnostics indicate that the main power supply circuits are operational and stable, the controller sends a Power Good signal to the timer chip. In step 62, the timer chip stops resetting the processors on the computer motherboard. Typically, the processor will begin execution of the basic input/output system (BIOS). In step 64, the processors run application software, including logic and drivers that operate a peripheral device powered by the power supply, such as an on-board printer. Although many peripheral devices receive power independent of the computer power supply, one embodiment is a point-of-sale computer that includes an on-board printer, scanner, bar code reader or other peripheral that receives power from the power supply. In step 66, the timer chip provides the power supply identification code to applications running on the processors. In step 68, the applications cross-reference a list of power supply identification codes and identify the capabilities of the power supply. In step 70, the applications provide output to the peripheral device as a function of the power supply capabilities. If the power supply capabilities support a higher operation of the peripheral, then the application may utilize additional features or send data at a higher rate than if the power supply did not have such capabilities.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   a power supply sending an identification code to a computing system prior to sending a power good signal to the computing system;
   the power supply providing auxiliary power to the computing system; and the computing system receiving the identification code and identifying capabilities of the power supply;

wherein the step of identifying capabilities of the power supply includes the computing system cross-referencing the received identification code against a list of power supply identification codes and the capabilities associated with each of the identification codes.

2. The method of claim 1, further comprising:
sending the identification code and the power good signal over the same conductor.

3. The method of claim 2, wherein the single conductor is a power supply connector pin.

4. The method of claim 1, wherein the power good signal is sent in response to determining that the power supply is delivering proper voltages to the computing system.

5. The method of claim 1, wherein the power supply does not include a serial bus interface.

6. The method of claim 1, wherein the power good signal is a +5 volt signal that prevents resetting a processor in the computing system.

7. The method of claim 1, wherein the power supply is installed within a chassis that includes the computing system.

8. The method of claim 1, further comprising:
the computing system controlling input/output as a function of the identified power supply capabilities.

9. A system comprising:
a computing system
a power supply having a coupled to the computing system having a controller that outputs an identification code prior to outputting a power good signal, wherein the power supply controller transmits the identification code and the power good signal over the same conductor pin.

10. The system of claim 9, wherein the computing system and the power supply are coupled by a power supply connector having a plurality of conductor pins.

11. The system of claim 10, wherein the plurality of conductor pins includes a conductor pin for auxiliary power, at least one conductor pin for main power, and a conductor pin for the power good signal.

12. The system of claim 9, wherein the power supply controller transmits the power good signal in response to determining that the power supply is delivering proper voltages to the computing system.

13. The system of claim 12, wherein the power good signal is a +5 volt signal that prevents resetting a processor in the computing system.

14. The system of claim 9, wherein the computing system stores a list of power supply identification codes and the capabilities associated with each of the identification codes.

15. The system of claim 9, wherein the computing system and the power supply are installed within a common chassis.

16. The system of claim 9, further comprising:
an output device receiving power from the power supply and output signals from the computing system.

17. A computer program product including computer usable program code embodied on a computer usable medium for identifying capabilities of a power supply coupled to the computer, the computer program product comprising:
computer usable program code for receiving an identification code from a power supply over a power supply conductor prior to receiving a power good signal over the power supply conductor; and
computer usable program code for cross-referencing the received identification code against a list of power supply identification codes and the capabilities associated with each of the identification codes to identify the capabilities of the power supply.

18. The computer program product of claim 17, further comprising:
computer usable program code for controlling instructions from the computer system to an output device as a function of the identified power supply capabilities.

* * * * *